United States Patent
Zhang et al.

(10) Patent No.: US 9,497,053 B2
(45) Date of Patent: Nov. 15, 2016

(54) UPSTREAM PILOT STRUCTURE IN POINT TO MULTIPOINT ORTHOGONAL FREQUENCY DIVISION MULTIPLEXING COMMUNICATION SYSTEM

(71) Applicant: Futurewei Technologies, Inc., Plano, TX (US)

(72) Inventors: Xiaofeng Zhang, Santa Clara, CA (US); Tao Ouyang, Santa Clara, CA (US); Dao Pan, Santa Clara, CA (US); Xiaoshu Si, Santa Clara, CA (US); Syed Rahman, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/204,540

(22) Filed: Mar. 11, 2014

(65) Prior Publication Data

US 2014/0254697 A1    Sep. 11, 2014

Related U.S. Application Data

(60) Provisional application No. 61/776,488, filed on Mar. 11, 2013.

(51) Int. Cl.
*H04L 27/12* (2006.01)
*H04L 5/00* (2006.01)
*H04L 27/26* (2006.01)

(52) U.S. Cl.
CPC .......... *H04L 27/122* (2013.01); *H04L 5/0051* (2013.01); *H04L 5/0094* (2013.01); *H04L 27/2613* (2013.01)

(58) Field of Classification Search
CPC . H04L 27/122; H04L 5/0051; H04L 5/0094; H04L 27/2613
USPC .......................................................... 375/260
See application file for complete search history.

(56) References Cited

U.S. PATENT DOCUMENTS

2002/0154620 A1* 10/2002 Azenkot ................. H04L 5/026
                                                              370/347
2006/0035643 A1*  2/2006 Vook et al. .................... 455/450

(Continued)

OTHER PUBLICATIONS

"Series G: Transmission Systems and Media, Digital Systems and Networks, Digital Sections and Digital Line System—Optical Line Systems for Local and Access Networks—Gigabit-capable Passive Optical Networks (GPON): Physical Media Dependen (PMD) Layer Specification", ITU-T Recommendation G.984.2, Mar. 2003, 38 pages.

(Continued)

*Primary Examiner* — Hassan Kizou
*Assistant Examiner* — Abdullahi Ahmed
(74) *Attorney, Agent, or Firm* — Conley Rose, P.C.; Grant Rodolph; Jonathan K. Polk

(57) ABSTRACT

A central access network unit comprising a processor configured to assign a plurality of upstream training blocks from an upstream OFDM symbol to a plurality of downstream network units, wherein the OFDM symbol comprises a plurality of pilot subcarriers equally spaced across an upstream RF spectrum in a pre-determined time interval, and wherein each upstream training block comprises a different subset of the pilot subcarriers that are non-consecutive and situated across the upstream RF spectrum, and generate one or more messages comprising assignments of the upstream training blocks, and a transmitter coupled to the processor and configured to transmit the messages to the plurality of downstream network units via a network, wherein the messages instruct at least one of the plurality of downstream network units to transmit a modulated pre-determined sequence at the pilot subcarriers corresponding to the upstream training block assigned to the downstream network unit.

14 Claims, 7 Drawing Sheets

(56) References Cited

U.S. PATENT DOCUMENTS

| | | | |
|---|---|---|---|
| 2009/0268604 A1* | 10/2009 | Yun | H04L 27/2633 370/210 |
| 2014/0079102 A1* | 3/2014 | Kliger et al. | 375/222 |
| 2014/0178076 A1* | 6/2014 | Fang et al. | 398/98 |

OTHER PUBLICATIONS

"Series G: Transmission Systems and Media, Digital Systems and Networks, Digital Sections and Digital Line System—Optical Line Systems for Local and Access Networks—Broadband Optical Access Systems Based on Passive Optical Networks (PON)", ITU-T Recommendation G.983.1, Jan. 2005, 124 pages.

"IEEE Standard for Information Technology, Telecommunications and Information Exchange Between Systems—Local and Metropolitan Area Networks—Specific Requirements, Part 3: Carrier Sense Multiple Access with Collision Detection (CSMA/CD) Access Method and Physical Layer Specifications, Amendment: Media Access Control Parameters, Physical Layers, and Management Parameters for Subscriber Access Networks", IEEE Computer Society, IEEE Standard 802.3ah, Sep. 7, 2004, 640 pages.

"IEEE P802.3av D2.2—Draft Standard for Information Technology, Telecommunications and Information Exchange Between Systems—Local and Metropolitan Area Networks—Specific Requirements, Part 3: Carrier Sense Multiple Access with Collision Detection (CSMA/CD) Access Method and Physical Layer Specifications, Amendment: Physical Layer Specifications and Management Parameters for 10Gb/s Passive Optical Networks", LAN/MAN Standards Committee of the IEEE Computer Society, Dec. 3, 2008, 267 pages.

"Next Generation Ethernet Passive Optical Network (NG-EPON), Industry Connections Activity Initiation Document (ICAID), Version: 1.93", IEEE Standards Association, Sep. 3, 2013, 6 pages.

"Data-Over-Cable Service Interface Specifications DOCSIS 3.1, MAC and Upper Layer Protocols Interface Specification", CM-SP-MULPIv3.1-I01-131029, Cable Television Laboratories, Inc., Oct. 29, 2013, 771 pages.

"Data-Over-Cable Service Interface Specifications DOCSIS 3.1, Physical Layer Specification", CM-SP-PHYv3.1-I01-131029, Cable Television Laboratories, Inc., Oct. 29, 2013, 220 pages.

Rahman, S., "Baseline Proposal for Upstream Wideband Probing", www.ieee802.org/3/bn/public/nov13/rahman_syed_3bn_02_1113.pdf, IEEE P802.3bn EPON Protocol of Coax (EPoC) Task Force Meeting, Dallas, Texas, Nov. 12-14, 2013, 3 pages.

Foreign Communication From a Counterpart Application, PCT Application No. PCT/US2014/023410, International Search Report dated Jul. 7, 2014, 4 pages.

Foreign Communication From a Counterpart Application, PCT Application No. PCT/US2014/023410, Written Opinion dated Jul. 7, 2014, 7 pages.

"MAC and Upper Layer Protocols Interface Specification," Data-Over-Cable Service Interface Specifications, Docsis 3.1, CM-SP-MULPLv3.1-I01-131029, Oct. 29, 2013, 771 pages.

"MAC and Upper Layer Protocols Interface Specification," Data-Over-Cable Service Interface Specifications, Docsis 3.1, CM-SP-MULPLv3.1-I03-140610, Oct. 6, 2014, 802 pages.

"Physical Layer Specification," Data-Over-Cable Service Interface Specifications, Docsis 3.1, CM-SP-PHYv3.1-I01-131029, Oct. 29, 2013, 220 pages.

"Physical Layer Specification," Data-Over-Cable Service Interface Specifications, Docsis 3.1, CM-SP-PHYv3.1-I03-140610, Oct. 6, 2014, 239 pages.

* cited by examiner

UPSTREAM PILOT STRUCTURE IN POINT TO MULTIPOINT ORTHOGONAL FREQUENCY DIVISION MULTIPLEXING COMMUNICATION SYSTEM

CROSS-REFERENCE TO RELATED APPLICATIONS

The present application claims priority to U.S. Provisional Patent Application 61/776,488, filed Mar. 11, 2013 by Xiaofeng Zhang, et. al., and entitled "Upstream Pilot Structure In Point To Multipoint Orthogonal Frequency Division Multiplexing Communication System", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over the last mile. PON may be a point-to-multipoint (P2MP) network with passive splitters positioned in an optical distribution network (ODN) to enable a single feeding fiber from a central office to serve multiple customer premises. PON may employ different wavelengths for upstream and downstream transmissions. Ethernet passive optical network (EPON) is a PON standard developed by the Institute of Electrical and Electronics Engineers (IEEE) and specified in IEEE documents 802.3ah and 802.3av, both of which are incorporated herein by reference. Hybrid access networks employing both EPON and other network types have attracted growing attention.

SUMMARY

In one embodiment, the disclosure includes a central access network unit comprising a processor configured to assign a plurality of upstream training blocks from an upstream orthogonal frequency division multiplexing (OFDM) symbol to a plurality of downstream network units, wherein the OFDM symbol comprises a plurality of pilot subcarriers equally spaced across an upstream radio frequency (RF) spectrum in a pre-determined time interval, and wherein each upstream training block comprises a different subset of the pilot subcarriers that are non-consecutive and situated across the upstream RF spectrum, and generate one or more messages comprising assignments of the upstream training blocks, and a transmitter coupled to the processor and configured to transmit the messages to the plurality of downstream network units via a network, wherein the messages instruct at least one of the plurality of downstream network units to transmit a modulated pre-determined sequence at the pilot subcarriers corresponding to the upstream training block assigned to the downstream network unit.

In another embodiment, the disclosure includes a method implemented by a Cable Modem Termination System (CMTS) comprising allocating a probing symbol within a probing frame, wherein the probing frame comprises a variable K number of contiguous probing symbols, and wherein each probing symbol comprises a plurality of subcarriers equally spaced across an upstream frequency spectrum of a data over cable service interface specification (DOCSIS) network in a pre-determined time interval, defining a probing pattern in the allocated probing symbol, wherein the probing pattern comprises a set of pilots from scattered subcarriers of the allocated probing symbol, and instructing a Cable Modem (CM) to transmit a probing sequence in the allocated probing symbol according to the defined probing pattern.

In another embodiment, the disclosure includes a method implemented by a Coaxial Line Terminal (CLT) comprising allocating a specific probing symbol to a Coaxial Network Unit (CNU) within a probing frame for upstream wideband probing, wherein the probing symbol comprises a plurality of pilots equally spaced across an upstream spectrum of an Ethernet passive optical network over coax (EPoC) in a pre-determined time interval, allocating a subset of scattered pilots within the probing symbol to the CNU, receiving the probing symbol from the CNU, performing upstream channel estimation from the received probing symbol.

In yet another embodiment, the disclosure includes a network unit in a coaxial network comprising a receiver configured to receive a message indicating an assigned upstream training block in an upstream OFDM symbol comprising a plurality of pilot subcarriers equally spaced in a frequency spectrum of the network unit in a pre-determined time interval, wherein the upstream training block comprises a subset of the pilot subcarriers that are non-consecutive and situated across the frequency spectrum, a processor coupled to the receiver and configured to generate the upstream training block by modulating a pre-determined sequence onto the pilot subcarriers of the upstream training block, and a transmitter coupled to the processor and configured to send the upstream training block via the coaxial network.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
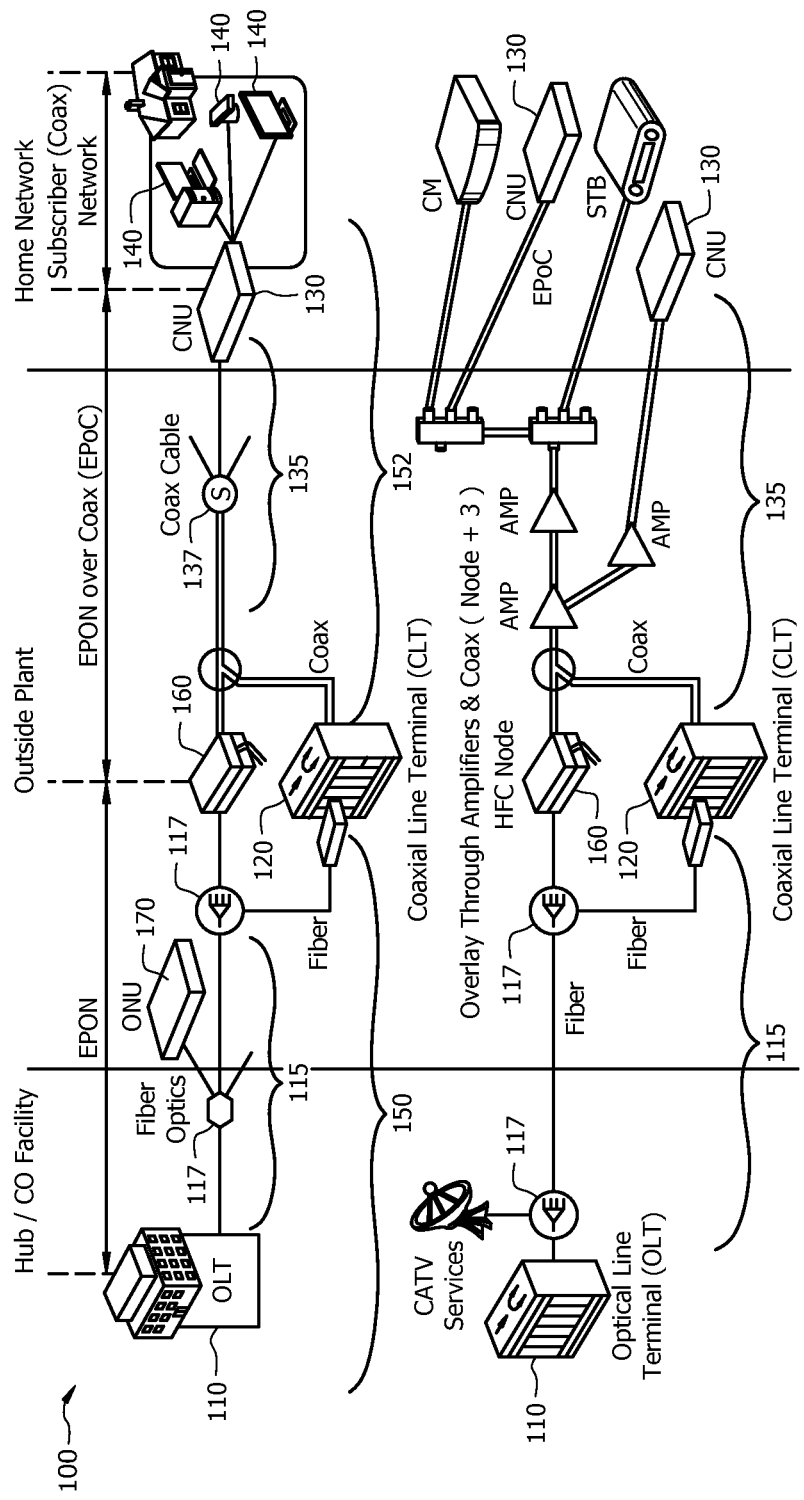
FIG. 1 is a schematic diagram of an embodiment of a unified optical-coaxial network.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Some hybrid access networks may combine optical networks with coaxial (coax) networks. Ethernet over Coax (EoC) may be a generic name used to describe all technologies that transmit Ethernet frames over a coaxial network. Examples of EoC technologies may include EPoC, DOCSIS, multimedia over coax alliance (MoCA), G.hn (a common name for a home network technology family of standards developed under the International Telecommunication Union (ITU) and promoted by the HomeGrid Forum), home phoneline networking alliance (HPNA), and home plug audio/visual (A/V). EoC technologies may have been adapted to run outdoor coax access from an Optical Network Unit (ONU) to an EoC head end with connected customer premises equipment (CPEs) located in subscriber homes. In a coaxial network, physical layer transmission may employ OFDM to encode digital data onto multiple carrier frequencies. Some advantages of OFDM transmission may include high spectral efficiency and robust transmission (e.g. attenuation at high frequencies in long coaxial wires, narrow band interferers, frequency selective noise, etc.).

An EPoC system may be a hybrid access network employing both optical and coaxial technologies. The EPoC may comprise an optical segment that may comprise a PON, and a coaxial segment that may comprise a coaxial cable network. In the PON segment, an OLT may be positioned in a local exchange or central office where the OLT may connect the EPoC access network to an Internet Protocol (IP), Synchronous Optical Network (SONET), and/or Asynchronous Transfer Mode (ATM) backbone. In the coaxial segment, CNUs may be positioned at end-user locations, and each CNU may serve a plurality (e.g. three to four) of end users which may be known as subscribers. A Fiber Coaxial Unit (FCU) may merge the interface between the PON segment and the coaxial segment of the network. The FCU may be a single box unit that may be located where an ONU and a CLT are fused together, for example, at a curb or at a basement of an apartment building. The CLT or FCU may employ OFDM transmission at a physical layer to communicate with the CNUs.

A DOCSIS network may operate over a hybrid fiber coax (HFC) network and may be structurally similar to an EPoC network. The DOCSIS network may comprise a CMTS positioned in a local exchange or central office where the CMTS may connect the HFC network to a backbone network. The CMTS may serve a plurality of CMs positioned at end-user locations. In some embodiments, a CMTS may be integrated with P2MP OFDM communication functionalities (e.g. channel estimation, scheduling).

In OFDM communication, a physical layer channel may be established prior to data transmission, for example, by performing channel training and/or estimation. In an embodiment, a CLT may designate an upstream OFDM symbol (e.g. probing symbol) for upstream channel measurement (e.g. upstream probing). The probing symbol may span in time and frequency, for example, the probing symbol may comprise a plurality of subcarriers (e.g. pilot subcarriers) equally spaced across an entire upstream RF spectrum (e.g. channel bandwidth of the symbol) in a pre-determined time interval (e.g. a symbol time). A CNU may transmit a pre-determined wideband sequence (e.g. pilot sequence or probing sequence) in the probing symbol by employing all pilot subcarriers in the probing symbol. When the CLT receives the probing symbol, the CLT may estimate upstream channel conditions between the CNU and the CLT at each of the pilot subcarriers by comparing the received signal to the pre-determined wideband sequence. In order to differentiate upstream transmissions between different CNUs, the CLT may assign a separate probing symbol for each CNU. However, channel bandwidth for upstream probing may increase as the number of connected CNUs increases in a network, and thus may result in lower bandwidth efficiency. It should be noted that in the present disclosure, the terms upstream training and probing are equivalent and may be used interchangeably. In addition, the terms FCU and CLT are equivalent and may be used interchangeably Disclosed herein is an upstream pilot scheme that may be performed by a P2MP OFDM communication system (e.g. a CLT or a CMTS) in a hybrid access network (e.g. an EPoC network or a DOCSIS network). A P2MP OFDM communication system may designate an upstream OFDM symbol as a probing symbol for measuring upstream channels between a plurality of downstream network units and the P2MP OFDM communication system. In an embodiment, a CLT or a CMTS may assign a plurality of upstream training blocks from a probing symbol to a plurality of CNUs or CMs, respectively, where each upstream training block may comprise a different subset of the pilot subcarriers that are non-consecutive and span across the upstream frequency spectrum. A CNU or a CM may transmit a wideband pilot sequence at the pilot subcarriers of an assigned upstream training block. The CNU or the CM may insert frequency nulls (e.g. values of zeroes) at the un-assigned pilot subcarriers (e.g. excluded subcarriers) so that the CNU or the CM may not interfere with other CNUs or CMs transmitting with a different set of pilot subcarriers in the same probing symbol. As such, the plurality of CNUs or CMs may transmit a different portion of the wideband pilot sequence at a different set of pilot subcarriers simultaneously in the duration of the probing symbol. In an embodiment, the upstream training block may be specified in terms of a starting pilot subcarrier and a fixed number of subcarriers to skip between successive assigned pilot subcarriers. The disclosed upstream pilot scheme may utilize upstream bandwidth efficiently by allowing multiple CNUs or CMs to transmit simultaneously in a same probing symbol and may provide comparable upstream SNR performance as an upstream pilot scheme that designates one probing symbol per CNU or CM. In addition, the disclosed upstream pilot scheme may allow a CMTS or CLT to probe a power starved (e.g. long distance and/or high attenuation channel) CNU or CM successfully by employing only a subset of the subcarriers of the OFDM symbol, where the CNU or CM may not have enough power to send a probing sequence with adequate power across all the subcarriers of the OFDM symbol.

FIG. 1 is a schematic diagram of an embodiment of a unified optical-coaxial network 100 comprising an optical portion 150 and a coaxial (electrical) portion 152. The network 100 may include an OLT 110, at least one CNU 130 coupled to a plurality of subscriber devices 140, and an CLT 120 positioned between the OLT 110 and the CNU 130, e.g., between the optical portion 150 and the coaxial portion 152. The OLT 110 may be coupled via an ODN 115 to the CLTs 120, and optionally to one or more ONUs 170, or one or more HFC nodes 160 in the optical portion 150. The ODN 115 may comprise fiber optics and an optical splitter 117 and/or a cascade of 1×M passive optical splitters that couple OLT 110 to the CLT 120 and any ONUs 170. The value of M in EPoC, e.g., the number of CLTs, may for example be 4, 8, 16, or other values and may be selected by the operator depending on factors such as optical power budget. The CLT 120 may be coupled to the CNUs 130 via an electrical distribution network (EDN) 135, which may comprise a cable splitter 137, a cascade of taps/splitters, and/or one or more amplifiers. Each OLT 110 port may serve 32, 64, 128 or 256 CNUs 130. It should be noted that the upstream transmissions from CNUs 130 may reach the CLT 120 and not the other CNUs 130 due to a directional property of the tap. The distances between the OLT 110 and the ONUs 170 and/or CLTs 120 may range from about 10 to about 20 kilometers (km), and the distances between the CLT 120 and CNUs 130 may range from about 100 to about 500 meters (m). The network 100 may comprise any number of HFCs 160, CLTs 120 and corresponding CNUs 130. The components of network 100 may be arranged as shown in FIG. 1 or any other suitable arrangement.

The optical portion 150 of the network 100 may be similar to a PON in that the optical portion 150 may be a communications network that does not require active components to distribute data between the OLT 110 and the CLT 120. Instead, the optical portion 150 may use the passive optical components in the ODN 115 to distribute data between the OLT 110 and the CLT 120. Examples of suitable protocols that may be implemented in the optical portion 150 may include asynchronous transfer mode PON (APON) or broadband PON (BPON) defined by the ITU Telecommunication Standardization Sector (ITU-T) document G.983, Gigabit PON (GPON) defined by ITU-T document G.984, the EPON defined by IEEE documents 802.3ah and 802.3av, all of which are incorporated by reference as if reproduced in their entirety, the wavelength division multiplexing (WDM) PON (WDM-PON), and the Next Generation EPON (NGE-PON) in development by IEEE.

The OLT 110 may be any device configured to communicate with the CNUs 130 via the CLT 120. The OLT 110 may act as an intermediary between the CLTs 120 and/or CNUs 130 and another backbone network (e.g. the Internet). The OLT 110 may forward data received from a backbone network to the CLTs 120 and/or CNUs 130 and forward data received from the CLTs 120 or CNUs 130 onto the backbone network. Although the specific configuration of the OLT 110 may vary depending on the type of optical protocol implemented in the optical portion 150, in an embodiment, OLT 110 may comprise an optical transmitter and an optical receiver. When the backbone network employs a network protocol that is different from the protocol used in the optical portion 150, OLT 110 may comprise a converter that may convert the backbone network protocol into the protocol of the optical portion 150. The OLT converter may also convert the optical portion 150 protocol into the backbone network protocol.

The ODN 115 may be a data distribution system that may comprise optical fiber cables, couplers, splitters, distributors, and/or other equipment. In an embodiment, the optical fiber cables, couplers, splitters, distributors, and/or other equipment may be passive optical components. Specifically, the optical fiber cables, couplers, splitters, distributors, and/or other equipment may be components that do not require any power to distribute data signals between the OLT 110 and the CLT 120. It should be noted that the optical fiber cables may be replaced by any optical transmission media in some embodiments. In some embodiments, the ODN 115 may comprise one or more optical amplifiers. The ODN 115 may extend from the OLT 110 to the CLT 120 and any optional ONUs 170 in a branching configuration as shown in FIG. 1, but may be alternatively configured as determined by a person of ordinary skill in the art.

The CLT 120 may be any device or component configured to forward downstream data from the OLT 110 to the corresponding CNUs 130 and forward upstream data from the CNUs 130 to the OLT 110. The CLT 120 may convert the downstream and upstream data appropriately to transfer the data between the optical portion 150 and the coaxial portion 152. The data transferred over the ODN 115 may be transmitted and/or received in the form of optical signals, and the data transferred over the EDN 135 may be transmitted and/or received in the form of electrical signals that may have the same or different logical structure as compared with the optical signals. As such, the CLT 120 may encapsulate or frame the data in the optical portion 150 and the coaxial portion 152 differently. In an embodiment, the CLT 120 may include a Media Access Control (MAC) layer and physical (PHY) layers, corresponding to the type of signals carried over the respective media. The MAC layer may provide addressing and channel access control services to the PHY layers. As such, the PHY may comprise an optical PHY and a coaxial PHY. In many embodiments, the CLT 120 may be transparent to the CNU 130 and OLT 110 in that the frames sent from the OLT 110 to the CNU 130 may be directly addressed to the CNU 130 (e.g. in the destination address), and vice-versa. As such, the CLT 120 may intermediate between network portions, namely an optical portion 150 and a coaxial portion 152 in the example of FIG. 1.

The ONUs 170 may be any devices that are configured to communicate with the OLT 110 and may terminate the optical portion 150 of the network. The ONUs 170 may present customer service interfaces to end users. In some embodiments, an ONU 170 may merge with a CLT 120 to form a FCU.

The electrical portion 152 of the network 100 may be similar to any known electrical communication system. The electrical portion 152 may not require any active components to distribute data between the CLT 120 and the CNU 130. Instead, the electrical portion 152 may use the passive electrical components in the electrical portion 152 to distribute data between the CLT 120 and the CNUs 130. Alternatively, the electrical portion 152 may use some active components, such as amplifiers. Examples of suitable protocols that may be implemented in the electrical portion 152 include MoCA, G.hn, HPNA, and Home Plug A/V.

The EDN 135 may be a data distribution system that may comprise electrical cables (e.g. coaxial cables, twisted wires, etc.), couplers, splitters, distributors, and/or other equipment. In an embodiment, the electrical cables, couplers, splitters, distributors, and/or other equipment may be passive electrical components. Specifically, the electrical cables, couplers, splitters, distributors, and/or other equipment may be components that do not require any power to distribute data signals between the CLT 120 and the CNU 130. It should be noted that the electrical cables may be replaced by any electrical transmission media in some embodiments. In some embodiments, the EDN 135 may comprise one or more electrical amplifiers. The EDN 135 may extend from the CLT 120 to the CNU 130 in a branching configuration as shown in FIG. 1, but may be alternatively configured as determined by a person of ordinary skill in the art.

In an embodiment, the CNUs 130 may be any devices that are configured to communicate with the OLT 110, the CLT 120, and any subscriber devices 140. The CNUs 130 may act as intermediaries between the CLT 120 and the subscriber devices 140. For instance, the CNUs 130 may forward data received from the CLT 120 to the subscriber devices 140, and may forward data received from the subscriber devices 140 toward the OLT 110. Although the specific configuration of the CNUs 130 may vary depending on the type of network 100, in an embodiment, the CNUs 130 may comprise an electrical transmitter configured to send electrical signals to the CLT 120 and an electrical receiver configured to receive electrical signals from the CLT 120. Additionally, the CNUs 130 may comprise a converter that may convert CLT 120 electrical signals into electrical signals for the subscriber devices 140, such as signals in IEEE 802.11 wireless local area network (WiFi) protocol. The CNUs 130 may further comprise a second transmitter and/or receiver that may send and/or receive the converted electrical signals to the subscriber devices 140. In some embodiments, CNUs 130 and coaxial network terminals (CNTs) are similar, and thus the terms are used interchangeably herein. The CNUs 130 may be typically located at distributed locations, such as the customer premises, but may be located at other locations as well.

The subscriber devices 140 may be any devices configured to interface with a user or a user device. For example, the subscribed devices 140 may include desktop computers, laptop computers, tablets, mobile telephones, residential gateways, televisions, set-top boxes, and similar devices.

Figure 2:
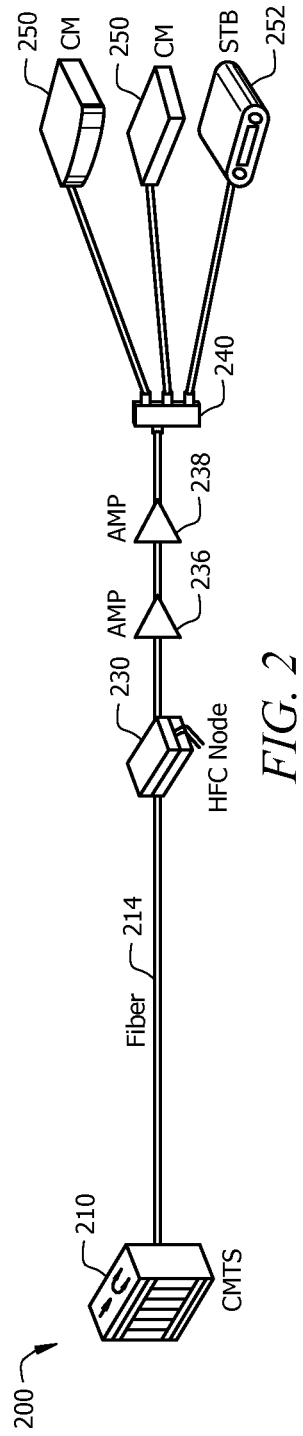
FIG. 2 is a schematic diagram of an embodiment of a DOCSIS network.

FIG. 2 is a schematic diagram of an embodiment of a DOCSIS network 200, which may be structurally similar to the network 100. The DOCSIS network 200 may be a DOCSIS 3.1 network as specified in DOCSIS 3.1 document, which is incorporated herein by reference as if reproduced in its entirety. The network 200 may comprise a CMTS 210, at least one HFC node 230, any number of CMs 250 and/or set-top box (STB) 252 arranged as shown in FIG. 2. Specifically, the HFC node 230 may be coupled to the CMTS 210 via an optical fiber 214, and the CMs 250 and/or STB 252 may be coupled to the HFC node 230 via electrical cables, one or more amplifiers (e.g., amplifiers 236 and 238), and at least one splitter 240. In implementation, the CMTS 210 may be substantially similar to the OLT 110, the HFC node 230 may be substantially similar to a CLT 130, and a CM 250 or a STB 252 may be substantially similar to a CNU 150. It should be noted that that the HFC node 230 may be remotely coupled to the CMTS 210 or reside in the CMTS 210. In some embodiments, the CMTS 210 may be equipped with part or all of the functionalities of the HFC node 230.

It should be noted that present disclosure may describe an upstream pilot scheme in the context of an EPoC network (e.g. network 100) or a DOCSIS network (e.g. network 200). However, a person of ordinary skill in the art will recognize that the upstream pilot scheme described herein may be applied to any network comprising a coaxial segment that employs P2MP OFDM transmission.

Figure 3:
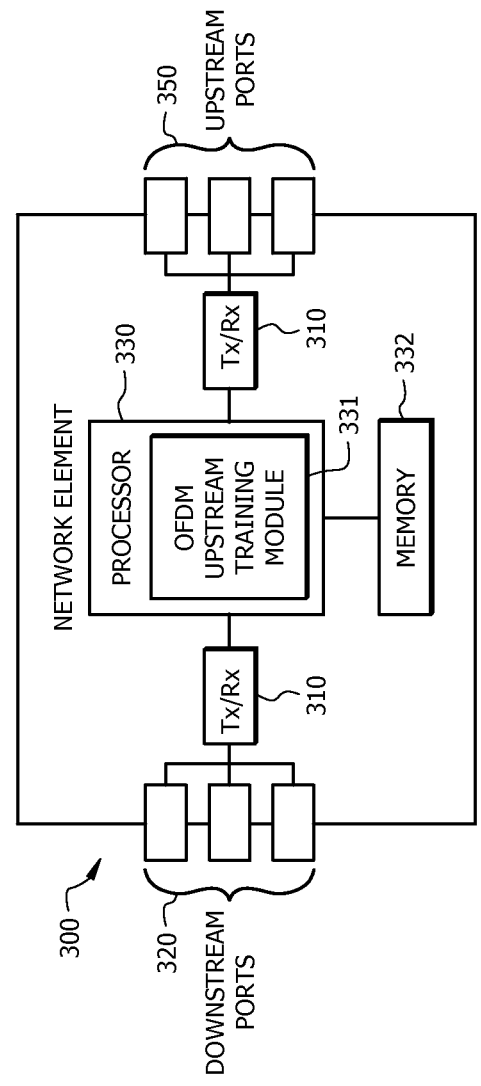
FIG. 3 is a schematic diagram of an embodiment of a network element (NE), which may act as a node in an EPoC network and/or a DOCSIS network.

FIG. 3 is a schematic diagram of an embodiment of an NE 300, which may act as a CLT (e.g. CLT 120) or a CMTS (e.g. CMTS 210) by implementing any of the schemes described herein. In some embodiments NE 300 may also act as other node(s) in the network, such as a media converter unit that may be coupled to an optical access network and an electrical wireless (e.g. WiFi) or wired network (e.g. coaxial, any Digital Subscriber Line (xDSL), powerline, etc) that employs OFDM transmission. One skilled in the art will recognize that the term NE encompasses a broad range of devices of which NE 300 is merely an example. NE 300 is included for purposes of clarity of discussion, but is in no way meant to limit the application of the present disclosure to a particular NE embodiment or class of NE embodiments. At least some of the features/methods described in the disclosure may be implemented in a network apparatus or component such as an NE 300. For instance, the features/methods in the disclosure may be implemented using hardware, firmware, and/or software installed to run on hardware. As shown in FIG. 3, the NE 300 may comprise transceivers (Tx/Rx) 310, which may be transmitters, receivers, or combinations thereof. A Tx/Rx 310 may be coupled to plurality of downstream ports 320 for transmitting and/or receiving frames from other nodes and a Tx/Rx 310 may be coupled to plurality of upstream ports 350 for transmitting and/or receiving frames from other nodes, respectively. A processor 330 may be coupled to the Tx/Rx 310 to process the frames and/or determine which nodes to send the frames to. The processor 330 may comprise one or more multi-core processors and/or memory devices 332, which may function as data stores, buffers, etc. Processor 330 may be implemented as a general processor or may be part of one or more application specific integrated circuits (ASICs) and/or digital signal processors (DSPs). Processor 330 may comprise an OFDM upstream training module 331, which may implement an upstream training method, such as method 700 or 800 at a CLT, a CMTS, or any other network nodes that perform upstream training for OFDM transmission, such as a CNU or CM. In an alternative embodiment, the OFDM upstream training module 331 may be implemented as instructions stored in the memory devices 332, which may be executed by processor 330. The memory device 332 may comprise a cache for temporarily storing content, e.g., a Random Access Memory (RAM). Additionally, the memory device 332 may comprise a long-term storage for storing content relatively longer, e.g., a Read Only Memory (ROM). For instance, the cache and the long-term storage may include dynamic random access memories (DRAMs), solid-state drives (SSDs), hard disks, or combinations thereof.

It is understood that by programming and/or loading executable instructions onto the NE 300, at least one of the processor 330 and/or memory device 332 are changed, transforming the NE 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

In an embodiment, OFDM transmission may be employed in a coaxial network or a hybrid access network (e.g. network 100 and/or 200) that comprises a coaxial segment. In OFDM transmission, digital data may be encoded onto multiple orthogonal subcarrier signals and transmitted in terms of OFDM symbols. An OFDM symbol may be defined as a group of frequency subcarriers equally spaced across an RF spectrum for communications in a pre-determined time interval (e.g. a symbol time duration). An OFDM frame may be defined as a group of pre-determined number of OFDM symbols that spans in time and frequency. A central network access unit (e.g. a P2MP OFDM communication system, CLT 120, CMTS 210) may designate an OFDM frame as a probing frame for upstream channel measurements (e.g. probing). The OFDM symbols within a probing frame may be referred to as probing symbols and the subcarriers within a probing symbol may be referred to as pilot subcarriers or pilots.

The central access network unit may divide a probing symbol into a plurality of upstream training blocks. For example, each upstream training block may comprise a different subset of the pilot subcarriers (e.g. assigned pilot subcarriers) scattered across an entire channel bandwidth of the probing symbol with skipped subcarriers (e.g. un-assigned pilot subcarriers) between the successive assigned pilot subcarriers. As such, the pilot subcarriers in an upstream training block may be non-consecutive (e.g. skipping some pilot subcarriers) in frequency, but may span across the entire upstream spectrum. The central access network unit may assign one or more of the upstream training blocks in a single probing symbol to one or more connected downstream network units (e.g. CNUs 130, CMs 250).

Each downstream network unit may transmit the pre-determined sequence according to the assigned upstream training block to enable upstream channel training, where the pre-determined sequence may be referred to as a pilot sequence, a probing sequence, or a wideband pilot sequence. For example, each downstream network unit may modulate a pilot sequence according to a Binary Phase Shift Keying (BPSK) modulation scheme into a series of BPSK symbols, map one BPSK symbol onto one pilot subcarrier in the probing symbol, and set the un-assigned pilot subcarriers to zeroes (e.g. frequency nulls). As such, each downstream network unit may transmit a different portion of the pilot sequence at a different subset of the pilot subcarriers (e.g. assigned pilot subcarriers) and transmit frequency nulls at the un-assigned pilot subcarriers, where the un-assigned pilot subcarriers may be assigned to other downstream network units. Thus, the simultaneous transmissions of the probing symbol from one downstream network unit may not interfere with another downstream network unit.

When the central access network unit receives the probing symbol, the central access network unit may compute an upstream channel response for each of the downstream network units that transmitted one or more of the assigned upstream training blocks in the probing symbol. For example, the central access network unit may compute an upstream channel estimate for a downstream network unit by comparing the received signal with the pre-determined pilot sequence at the assigned pilot subcarriers of the one or more upstream training blocks corresponding to the downstream network unit and interpolating the computed channel estimates to obtain channel estimates at the frequency subcarriers that are excluded from the one or more assigned upstream training blocks.

In an embodiment of upstream training, a central access network unit may determine upstream pre-equalizer taps (e.g. coefficients) according to an upstream channel response estimated for a downstream network unit and may transmit the pre-equalizer coefficients to the downstream network unit. The downstream network unit may apply an upstream pre-equalizer with the received coefficients prior to transmitting a signal to the central access network unit. As such, the central access network unit may receive a signal with a flat response (e.g. with channel distortion pre-compensated) from the downstream network unit, and thus may simplify upstream channel equalization.

In another embodiment of upstream training, a central access network unit may measure SNR for each subcarrier (e.g. per tone SNR) and determine an appropriate bit loading (e.g. number of data bits) for each subcarrier according to the measured SNR. For example, the central access network unit may assign a higher order modulation scheme (e.g. 64 Quadrature Amplitude Modulation (QAM) with six bits per tone, 256 QAM with eight bits per tone) for a high SNR subcarrier and a lower order modulation scheme (e.g. BPSK with one bit per tone) for a low SNR subcarrier. In addition, the central access network unit may dynamically adjust the bit loading for each subcarrier to adapt to changes in upstream channel conditions (e.g. varying SNRs).

Figure 4:
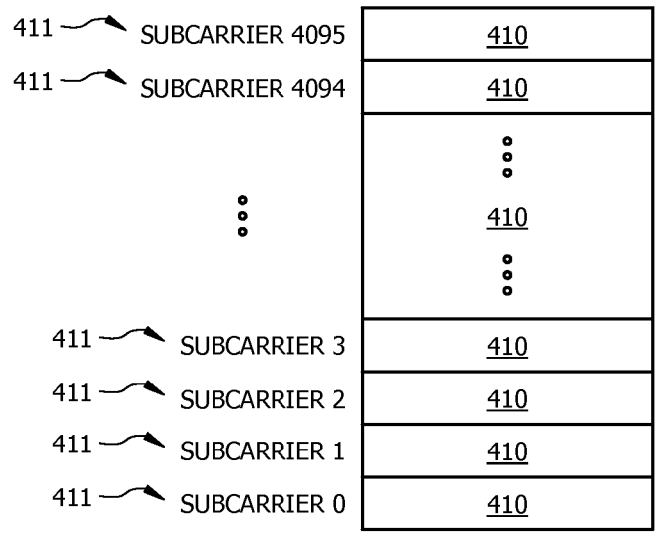
FIG. 4 is a schematic diagram of an embodiment of a probing symbol comprising one upstream training block.

FIG. 4 is a schematic diagram of an embodiment of a probing symbol 400 comprising one upstream training block 410 that spans the entire probing symbol 400. The probing symbol 400 may comprise a plurality of pilot subcarriers 411. For example, probing symbol 400 may comprise 4096 pilot subcarriers for a 4K Fast Fourier Transform (FFT), 2048 pilot subcarriers for a 2K FFT, etc. The upstream training block 410 may be assigned with all the 4096 pilot subcarriers 411 (e.g. active subcarriers) without skipping subcarriers. As such, the upstream training block 410 may be employed to transmit a wideband pilot sequence at the pilot subcarriers 411 (e.g. from subcarrier zero to 4095 for 4K FFT) in the probing symbol 400.

Figure 5:
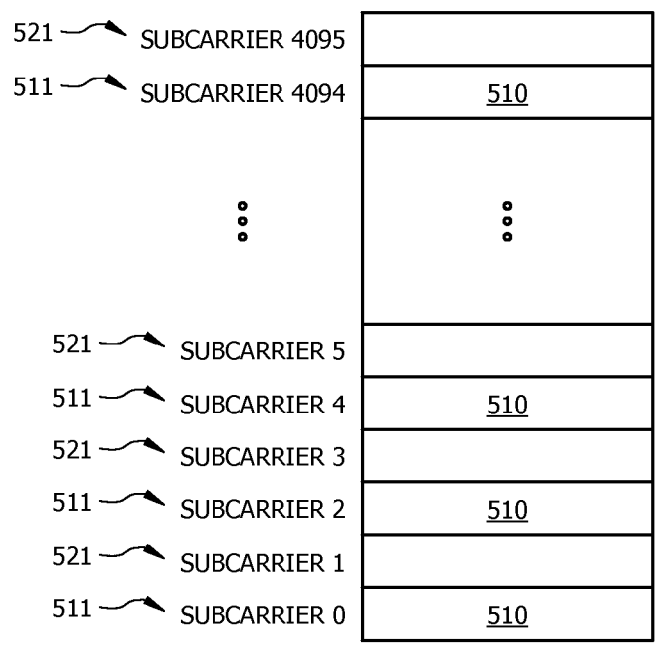
FIG. 5 is a schematic diagram of another embodiment of a probing symbol comprising one upstream training block.

FIG. 5 is a schematic diagram of another embodiment of a probing symbol 500 comprising an upstream training block 510. The probing symbol 500 may comprise a plurality of pilot subcarriers 511 and 521. For example, probing symbol 500 may comprise 4096 pilot subcarriers for a 4K FFT, 2048 pilot subcarriers for a 2K FFT, etc. The upstream training block 510 may be assigned with alternating pilot subcarriers 511 and not assigned with pilot subcarriers 521 by skipping one subcarrier 521 between successive assigned pilot subcarriers 511. The skipped subcarriers 521 may be skipped for various reasons, for example, another system may be transmitting on the excluded subcarriers 521. As such, the upstream training block 510 may be employed to transmit a portion of a wideband pilot sequence at alternating pilot subcarriers 511 (e.g. assigned pilot subcarriers) in the probing symbol 500.

Figure 6:
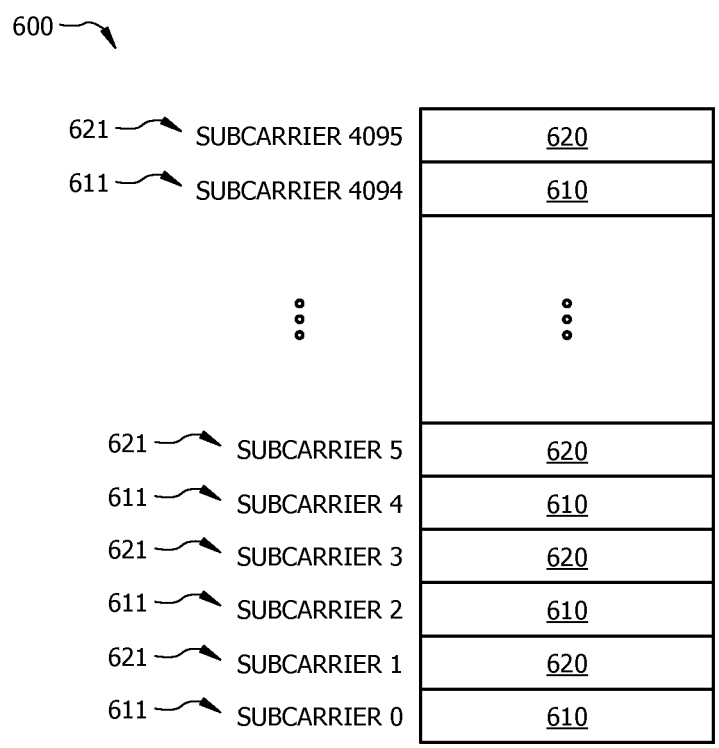
FIG. 6 is a schematic diagram of another embodiment of a probing symbol comprising three upstream training blocks.

FIG. 6 is a schematic diagram of another embodiment of a probing symbol 600 comprising two upstream training blocks 610 and 620. The probing symbol 600 may comprise a plurality of pilot subcarriers 611 and 621. For example, probing symbol 600 may comprise 4096 pilot subcarriers for a 4K FFT, 2048 pilot subcarriers for a 2K FFT, etc. The upstream training block 610 may start at the lowest frequency subcarrier (e.g. subcarrier zero) and comprise every second pilot subcarriers 611 in the probing symbol 600. The upstream training block 620 may start at the next lowest frequency subcarrier (e.g. subcarrier one) and comprise every second pilot subcarriers 621 in the probing symbol 600. Thus, each upstream training block 610 or 620 may be employed to transmit a different portion of a wideband pilot sequence at the pilot subcarriers 611 or 621, respectively. As such, the upstream training blocks 610 and 620 may interleave in frequencies, but may not overlap in frequencies. It should be noted that a central access network unit (e.g. CLT 120, CMTS 210) may assign the upstream training blocks 610 and 620 to two different downstream network units (e.g. CNUs 130, CMs 250), for example, the central access network unit may assign the upstream training block 610 to a downstream network unit A and the upstream training block 620 to a downstream network unit B. Thus, a central access network unit may assign M upstream training blocks to M downstream network units, where each upstream training block may comprise a different set of pilot subcarriers and the successive pilot subcarriers in a upstream training block may be separated by M−1 subcarriers.

In an embodiment of an EPoC network, such as network 100, a CLT (e.g. CLT 120) may allocate a specific probing symbol to a CNU within a probing frame and instruct the CNU (e.g. CNU 130) to transmit a probing sequence in the symbol. The CLT may assign the CNU all the pilots or a subset of (e.g. scattered) pilots of the assigned probing symbol. The CNU may transmit pilots spanning all active subcarriers during upstream wideband probing. The CNU may transmit one pilot per subcarrier. Each pilot may be a pre-defined BPSK symbol. The OFDM symbol which is used for probing may be defined as a probing symbol. The CLT may employ the received probing symbol upstream channel estimation and/or upstream SNR measurements. For example, the CLT may compute coefficients of an upstream pre-equalizer for each CNU and send the coefficients back to the corresponding CNU. In addition, the CLT may measure SNR per subcarrier and compute an upstream bit loading table for each CNU. It should be noted that a CNU may not transmit a probing sequence in an excluded subcarrier. The excluded subcarriers may be the subcarriers in which no CNU may be allowed to transmit because the excluded subcarriers may be at frequencies employed by other systems (e.g. including guard-band subcarriers). The probing pattern may continue un-interrupted in presence of excluded subcarriers and/or guard bands. However, the CNU may not transmit any pilots in the excluded subcarrier and/or guard bands.

In an embodiment of a DOCSIS network, such as network 200, upstream wideband probing may be employed during admission and steady state for pre-equalization configuration and periodic transmission power and time-shifting ranging. In a DOCSIS network, a CMTS (e.g. CMTS 210) may designate an OFDM frame for upstream probing, where the probing frame may comprise K contiguous probing symbols (e.g. OFDM symbols), where K is the number of symbols in a minislot (e.g. a group of subcarriers in the K number of symbols). The probing frame may be aligned with the minislot boundaries in a time domain. A probing symbol may comprise pilots that are BPSK subcarriers, generated from a Pseudo Random Binary Sequence (PRBS) generation scheme, which may be discussed more fully below. A CMTS may allocate a specific probing symbol within a probing frame to a CM (e.g. CM 250) and instruct the CM to transmit a probing sequence in the probing symbol. The CMTS may define a probing pattern comprising pilots from all the subcarriers of the assigned probing symbol or a set of pilots from scattered subcarriers of the assigned probing symbol. A CM may generate a wideband pilot sequence according to the PRBS generation scheme to generate 2048 or 4096 subcarriers for a 2K FFT or 4K FFT, respectively. The CM may employ the same BPSK modulation for a specific subcarrier in all probing symbols. The CM may not transmit a probing sequence in an excluded subcarrier. The CM may transmit zero valued subcarriers in the excluded subcarriers. Excluded subcarriers may be subcarriers in which no CM may be allowed to transmit because the excluded subcarriers may be at frequencies employed by other system (e.g. including guard-band subcarriers).

In an embodiment, a wideband pilot sequence may be generated by a pre-determined PRBS generation scheme. For example, the polynomial definition for the PRBS scheme may be as shown below:

$$X^{12}+X^9+X^8+X^5+1$$

where a seed of 3071 and a period of $2^{12}-1$ bits may be employed. The period of $2^{12}-1$ bits may be sufficient to create one probing symbol without repetitions. The wideband pilot sequence may be mapped to BPSK pilots. For example, a value of zero may be mapped to a BPSK pilot of one and a value of one may be mapped to a BPSK pilot of minus one. As such, the probing symbol pilots are BPSK symbols. A probing pilot i may be associated with the i-th subcarrier of the symbol, where i=0, 1, . . . , 4095 for a 4K FFT and i=0, 1, . . . , 2047 for a 2K FFT It should be noted that the subcarriers may be numbered in ascending order starting from zero.

In an embodiment, a central access network unit may assign an upstream training block by specifying a symbol number for upstream probing, a starting pilot subcarrier number (e.g. ranges from zero to seven) and a number of subcarriers to skip between successive pilot subcarriers in the symbol. The central access network unit may send the upstream training block assignment in a message (e.g. an upstream bandwidth allocation map (MAP) message). For example, the symbol number may be specified in terms of a number of symbols offset a start of a probing frame and the probing frame may be specified in terms of a number of OFDM frames offset from the beginning of a frame that corresponds to an allocation start time specified in the message.

In an embodiment of an EPoC network, such as network 100, a CLT (e.g. CLT 120) may specify a probing symbol within a probing frame through a Symbol In Frame parameter. The CLT may allocate subcarriers within the probing symbol by sending two parameters to a CNU (e.g. CNU 130), a start subcarrier parameter and a subcarrier skipping parameter. The start subcarrier parameter may refer to a starting subcarrier number and may comprise values ranging from about zero to about seven. The subcarrier skipping parameter may refer to the number of subcarriers to be skipped between successive pilots and may comprise values ranging from about zero to about seven. A value of zero for the skipping subcarrier (e.g. subcarrier skipping=0) may refer to no skipping of subcarriers (e.g. all subcarriers may be used for probing). For example, the upstream training block 410 in the probing symbol 400 may be specified with a starting subcarrier parameter value of zero and a subcarrier skipping parameter of zero. Similarly, the upstream training block 510 in the probing symbol 500 may be specified with a starting subcarrier parameter value of zero and a subcarrier skipping parameter of one. A CLT may specify the upstream training block 610 with a starting subcarrier parameter value of zero and a skipping parameter value of one when assigning the upstream training block to a downstream network unit A. Similarly, a CLT may specify the upstream training block 620 with a starting subcarrier parameter value of one and a skipping parameter value of one when assigning the upstream training block to a downstream network unit B.

In an embodiment of a DOCSIS network, such as network 200, a CMTS (e.g. CMTS 210) may specify a probing symbol within a probing frame through a parameter Symbol In Frame and may specify additional parameters, such as a start subcarrier parameter and a subcarrier skipping parameter. The start subcarrier parameter may refer to a starting subcarrier number and the start subcarrier parameter value may range from about zero to about seven. The skipping subcarrier parameter may refer to the number of subcarriers to be skipped between successive pilot and the skipping subcarrier parameter value may range from about zero to about seven. A skipping subcarrier parameter value of zero (e.g. skipping subcarrier=0) may refer to no skipping of subcarriers, for example, all subcarriers in a single symbol may belong to a single transmitter. In such an embodiment, a CM may employ the start subcarrier and subcarrier skipping parameters to determine which subcarriers may be employed for probing transmission.

Figure 7:
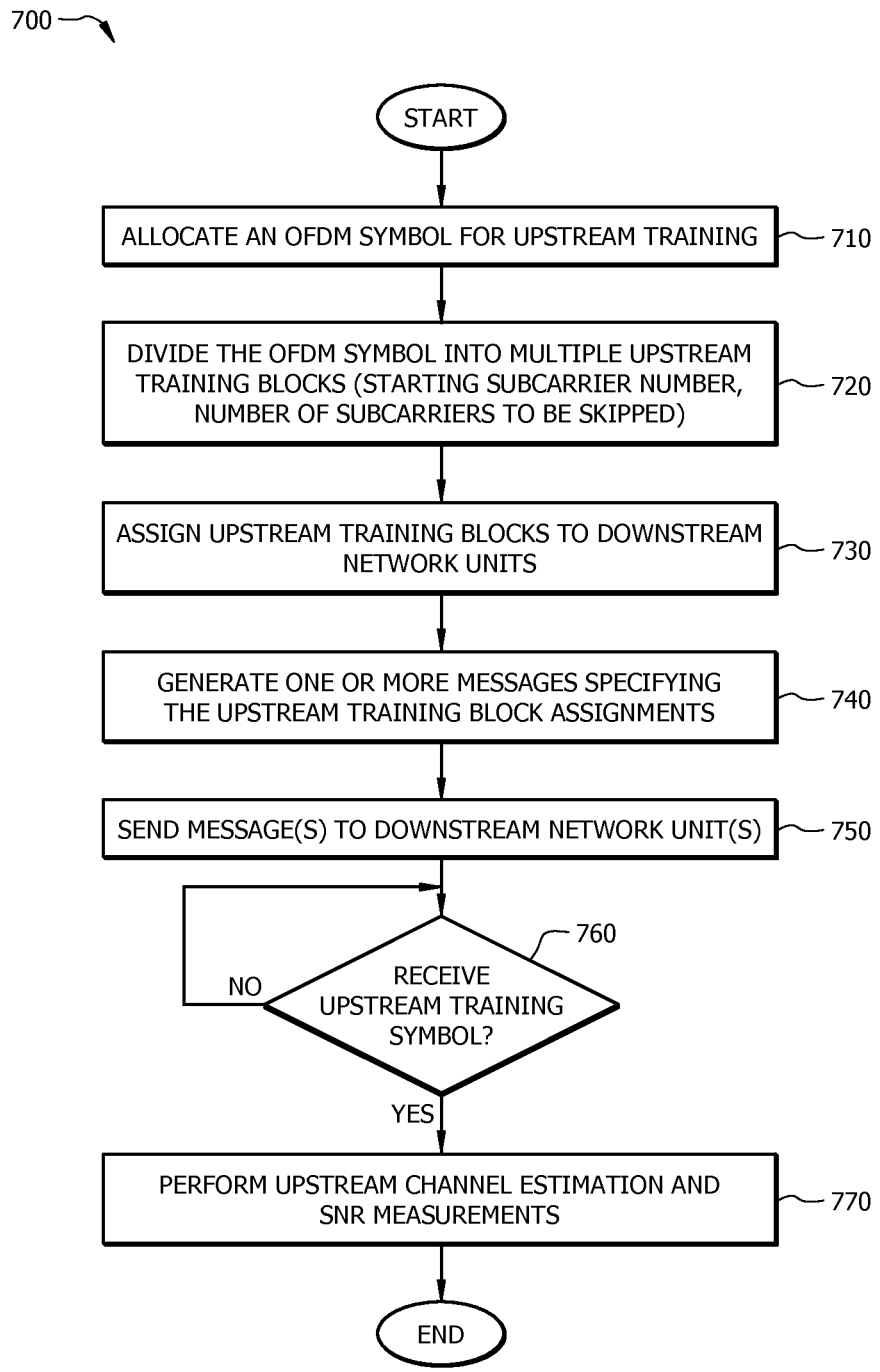
FIG. 7 is a flowchart of an embodiment of an upstream training method.

FIG. 7 is a flowchart of an embodiment of an upstream training method 700. Method 700 may be implemented by a central access network unit (e.g. CLT 120, CMTS 210, and/or NE 300) during upstream training. Method 700 may begin with allocating an OFDM symbol for upstream training at step 710. At step 720, method 700 may divide the OFDM symbol into a plurality of upstream training blocks, where each upstream training block may be specified in terms of a starting subcarrier number (e.g. a first assigned pilot subcarrier) and a number of subcarriers to skip between the successive pilot subcarriers. For example, each upstream training block may comprise a different starting subcarrier number, but may comprise the same number of skipping subcarriers. As such, the upstream training blocks may comprise a different set of pilot subcarriers that are non-consecutive pilot subcarriers and span across the upstream frequency spectrum.

At step 730, method 700 may assign the upstream training blocks to one or more downstream network units. At step 740, method 700 may generate a message indicating the assignments of the upstream training blocks. For example, each assignment may comprise an identifier that identifies a downstream network unit for the assignment, a probing frame number (e.g. OFDM frame offset from an allocation start time), a symbol number in a probing frame (e.g. OFDM symbol offset from a start of an OFDM frame), a starting subcarrier number (e.g. subcarrier offset from a lowest frequency of an OFDM symbol), and a number of skipping subcarriers between successive pilot subcarriers. It should be noted that in some embodiments, method 700 may generate more than one message to indicate the assignments of the upstream training blocks depending on the employed message protocol.

At step 750, method 700 may send the message to the downstream network units. After sending the message to the one or more downstream network units, method 700 may wait for the assigned probing symbol to be received from the downstream network units at step 760. Upon receiving the probing symbol, method 700 may perform upstream channel estimation and SNR measurements at step 770. For example, method 700 may compute an upstream channel estimate for each downstream network unit at the pilot subcarriers of an upstream training block assigned to the downstream network unit by comparing the received signal value to a pre-determined sequence (e.g. specified by a standard body or a network configuration). After computing the channel estimates at the pilot subcarriers of the upstream training block assigned to the downstream network unit, method 700 may interpolate the computed channel estimates to obtain channel estimates for the skipped subcarriers. It should be noted that method 700 may be applied dynamically or periodically for upstream channel measurement such that upstream transmissions may be adapted to channel variations.

In an embodiment of an EPoC network, such as network 100, a CLT (e.g. CLT 120) may schedule a single CNU (e.g. CNU 130) in a probing symbol without skipping subcarriers (e.g. upstream training block 410 in probing symbol 400). In such embodiment, the CLT may allocate a specific probing symbol to a single CNU, and may set a subcarrier skipping parameter value to zero and a starting subcarrier parameter value to a number of the first subcarrier in the probing symbol.

In an alternative embodiment of an EPoC network, such as network 100, a CLT (e.g. CLT 120) may schedule a single CNU (e.g. CNU 130) in a probing symbol with skipping subcarriers to create nulls (e.g. upstream training block 510 in probing symbol 500). In such an embodiment, the CLT may allocate a specific probing symbol to a single CNU, and may set a subcarrier skipping parameter value to a non-zero positive integer value and a start subcarrier parameter value to a number of the first subcarrier in the probing symbol.

In yet another alternative embodiment of an EPoC network, such as network 100, a CLT (e.g. CLT 120) may schedule multiple CNUs (e.g. CNUs 130) in a probing symbol (e.g. probing symbol 600). In such an embodiment, the CLT may allocate the same probing symbol at any given time to more than one CNU. The CLT may assign a different start subcarrier to each CNU and the same subcarrier skipping value to every CNU within the probing symbol. It should be noted that in such an embodiment, the CLT may or may not assign skipping subcarriers to create nulls, for example, the CLT may create nulls by specifying a subcarrier skipping value equal to or greater than the number of CNUs in the pattern.

Figure 8:
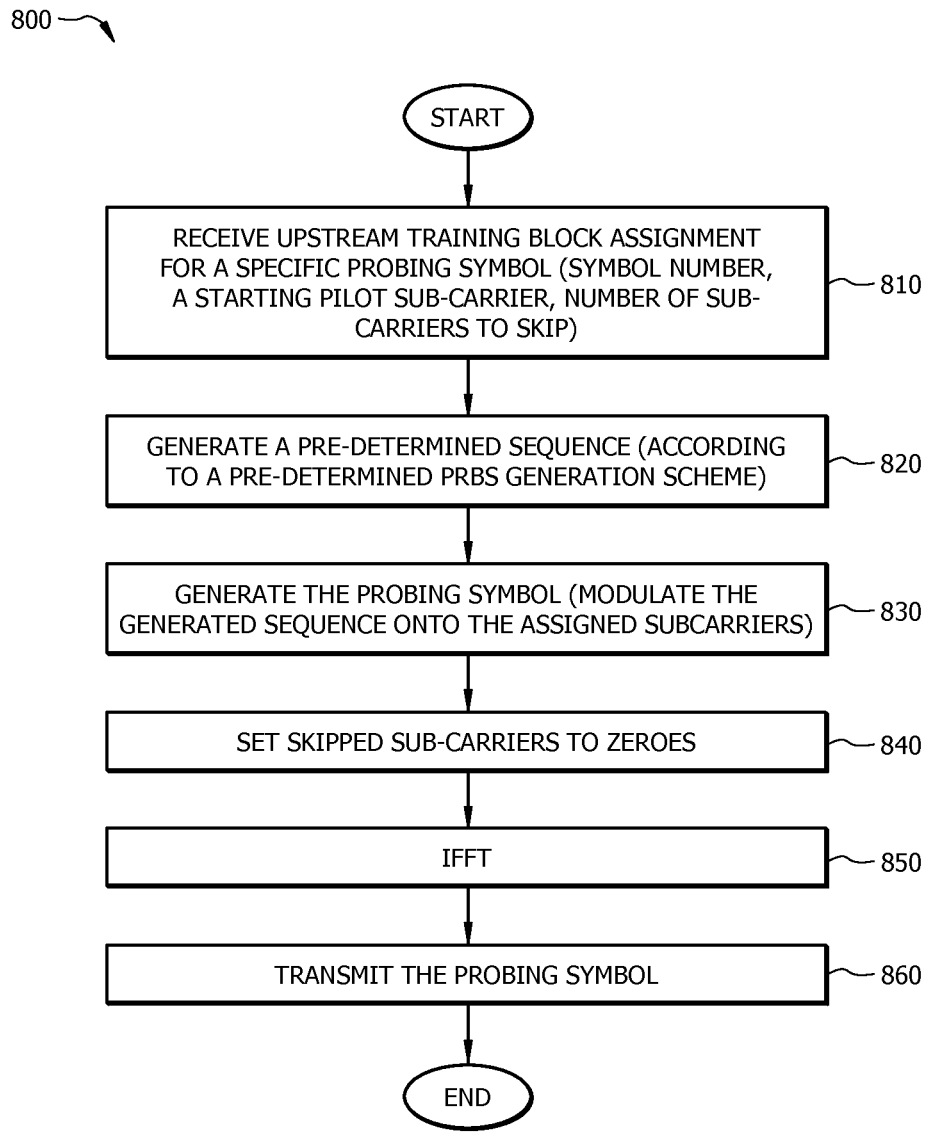
FIG. 8 is a flowchart of another embodiment of an upstream training method.

FIG. 8 is a flowchart of another embodiment of an upstream training method 800. Method 800 may be implemented by a downstream network unit (e.g. CNU 130, CM 250, and/or NE 300) during upstream training. Method 800 may begin with receiving an upstream training block assignment for a specific probing symbol in step 810. For example, the upstream training block assignment may indicate a symbol number (e.g. offset from a start of an OFDM frame) for the probing symbol, a starting subcarrier number (e.g. a first assigned pilot subcarrier) and a number of skipping subcarriers between successive assigned pilot subcarriers in the probing symbol. At step 820, method 800 may generate a pre-determined sequence according to a pre-determined generation scheme (e.g. a PRBS scheme). At step 830, method 800 may generate the probing symbol in a frequency domain by modulating the generated sequence onto the assigned subcarriers of the probing symbol. At step 840, method 800 may set the skipped subcarriers to values of zeroes. At step 850, method 800 may perform an inverse Fast Fourier Transform (IFFT) to transform the probing symbol to a time domain. The step 860, method 800 may transmit the probing symbol at a time specified by the assignment.

Figure 9:
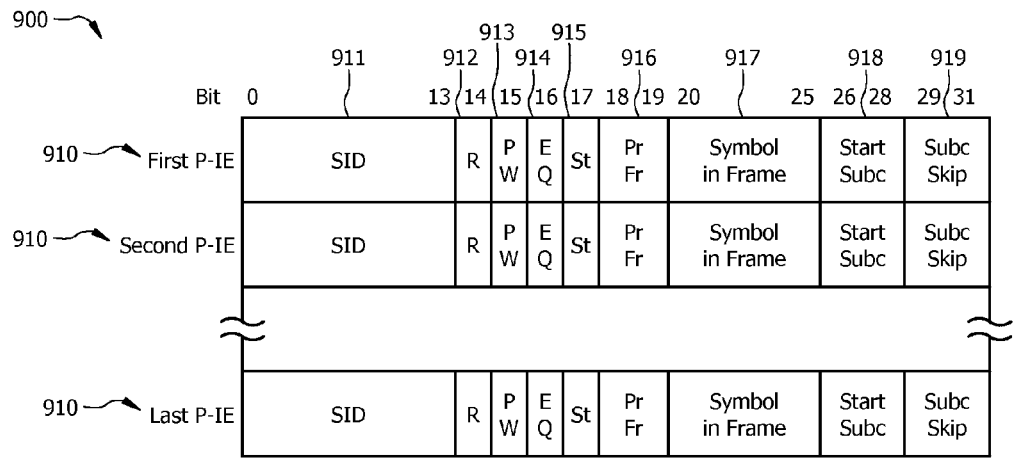
FIG. 9 is a schematic diagram of an embodiment of an upstream training message encoding.

FIG. 9 is a schematic diagram of an embodiment of an upstream training message encoding 900. The upstream training message structure 900 may be transmitted by a central access network unit (e.g. CLT 120, CMTS 210) to one or more downstream network units (e.g. CNUs 130, CMs 250) in a hybrid access network (e.g. network 100, 200) to indicate usage of symbols in a probing frame. For example, the upstream training message structure 900 may be embedded in a MAP message. The message structure 900 may comprise a plurality of successive probing information elements (P-IEs) 910 that describe the specific usage of symbols within a probing frame (e.g. one P-IE 910 per probing symbol). Each P-IE 910 may be about thirty two bits in length and the bits within the P-IE 910 may be numbered from bit position zero to bit position thirty one. Each P-IE 910 may comprise a service flow identifier (SID) field 911, a reserved (R) field 912, a power (PW) field 913, an equalizer (EQ) field 914, a stagger (St) field 915, a probing frame (PrFr) field 916, a Symbol In Frame field 917, a start subcarrier (Start Subc) field 918, and a subcarrier skip (Subc Skip) field 919. It should be noted that the central access network unit may indicate the successive P-IE 910 in message structure 900 in a time-order (e.g. earliest symbol first) and subcarrier order (e.g. lowest subcarrier first). In addition, a probing frame may comprise a combination of allocation probing symbols and unallocated probing symbols.

The SID field 911 may be about fourteen bits in length and may extend from bit position zero to bit position thirteen. The SID field 911 may comprise data indicating a ranging SID for a downstream network unit assigned to use the P-IE 910. The R field 912 may be about two bits in length and may extend from bit position fourteen to bit position fifteen. The R field 912 may be reserved for future extension.

The PW field 913 may be about one bit in length and may be positioned at bit position fifteen. The PW field 913 may indicate whether power control may be employed for probing. For example, the PW field 913 may be set to a value of zero to instruct a downstream network unit identified by the SID specified in the SID field 911 to transmit with normal power settings and set to a value of one to instruct the downstream network unit to transmit with modified power setting communicated in a previous ranging response (RNG-RSP) message.

The EQ field 914 may be about one bit in length and may be positioned at bit position sixteen. The EQ field 914 may indicate whether a transmit equalizer may be employed for probing. For example, the EQ field 914 may be set to a value of zero to instruct a downstream network unit identified by the SID specified in the SID field 911 to enable the transmit equalizer and set to a value of one to instruct the downstream network unit to disable the transmit equalizer.

The St field 915 may be about one bit in length and may be positioned at bit position seventeen. The St field 915 may indicate whether a staggered pattern may be employed for pilot subcarriers. For example, the St field 915 may be set to a value of one to instruct a downstream network unit identified by the SID specified in the SID field 911 to repeat a pattern in P-IE 910 in the next number of symbols equal in quantity to Subc Skip field 919 and by moving the pattern up by one subcarrier in each symbol and wrapping the pattern back to the beginning. Alternatively, the St field 915 may be set to a value of zero to instruct the downstream network unit employ pilot subcarriers without a staggered pattern.

The PrFr field 916 may be about two bits in length and may extend from bit position eighteen to bit position nineteen. The PrFr field 916 may comprise data indicating a number of frames offset from a frame beginning at an allocation start time specified in a MAP message that carries the message structure 900 and may indicate the first frame for which the P-IE 910 is applicable. For example, the PrFr field 916 may be set to a value of zero to indicate a first probing frame of the MAP.

The Symbol In Frame field 917 may be about six bits in length and may extend from bit position twenty to bit position twenty five. The Symbol In Frame field 917 may comprise data indicating a number of symbols offset from the beginning of a probing frame specified in the PrFr field 915. For example, the Symbol In Frame field 917 may comprise a value ranging from zero to thirty five and a value of zero may indicate a first symbol of the probing frame.

The Start Subc field 918 may be about three bits in length and may extend from bit position twenty six to bit position twenty eight. The Start Subc field 918 may comprise data indicating a starting subcarrier to be employed by probing. For example, the Start Subc field 918 may be set to a value of zero to indicate a first subcarrier in a symbol specified by the Symbol In Frame field 917.

The Subc Skip field 919 may be about three bits in length and may extend from bit position twenty nine to bit position thirty one. The Subc Skip field 919 may comprise data indicating a number of subcarriers to be skipped between successive pilots in a probe. For example, the Subc Skip field 919 may be set to a value of zero to indicate no skipping of subcarriers and that all non-excluded subcarriers may be employed for probing. It should be noted that the Subc Skip field 919 may indicate additional information when staggering is employed. For example, the value of the Subc Skip field 919 plus one may indicate a total number of symbols for which the staggered P-IE allocation may be applied in the probing frame.

Figure 10:
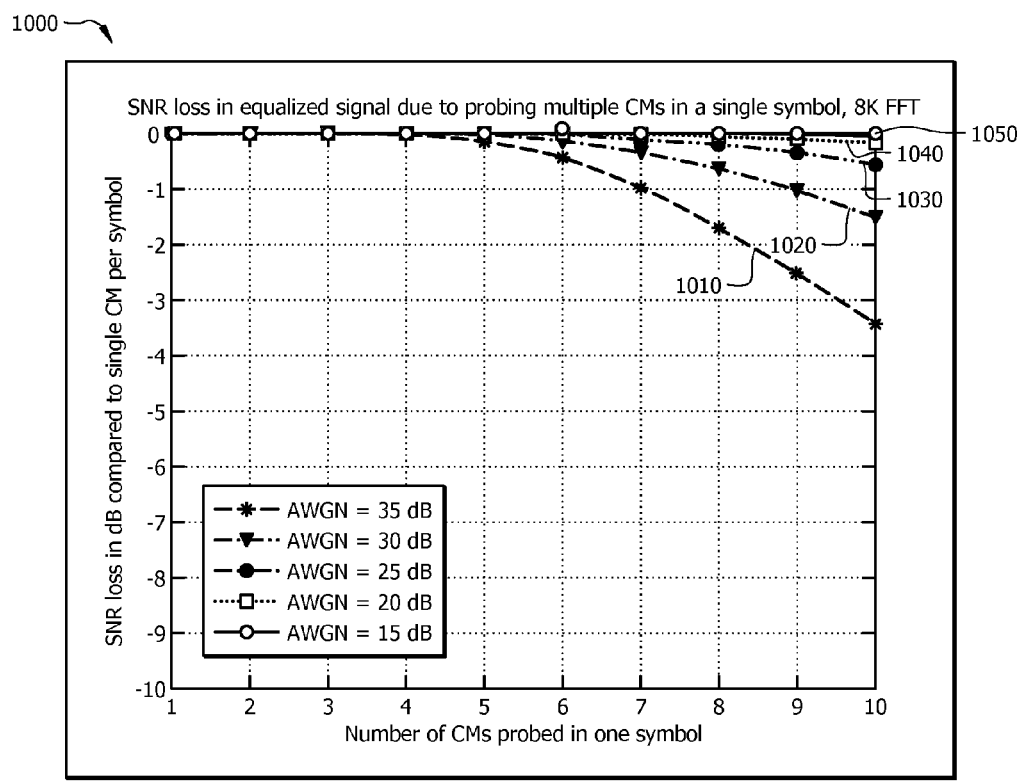
FIG. 10 illustrates a graph of an embodiment of upstream Signal-to-Noise Ratio (SNR) loss as a function of number of probing downstream network units in a single probing symbol.

FIG. 10 illustrates a graph 1000 of an embodiment of upstream SNR loss as a function of number of probing downstream network units in a single probing symbol. The x-axis may represent a number of probing downstream network units per probing symbol and the y-axis may represent SNR loss in units of decibels (dBs) when compared to probing a single downstream network unit. In graph 1000, curves 1010, 1020, 1030, 1040, and 1050 may represent upstream SNR loss versus number of downstream network units probed in a single probing symbol for an Additive White Gaussian Noise (AWGN) channel of 35 dB, 30 dB, 25 dB, 20 dB, and 15 dB, respectively. As can be observed from the curves 1010, 1020, 1030, 1040, and 1050, the SNR loss from probing up to about four downstream network units in a single symbol may be minimal and the SNR may be comparable to probing one downstream network unit per probing symbol. However, the SNR may gradually degrade as the number of downstream network units increases and the rate of degradation may vary depending on channel conditions. For example, the SNR may degrade at a slower rate (e.g. slope of curve 1050, about 0.1 dB SNR loss for ten probing downstream network units) for a low SNR channel as channel noise may be dominated by the AWGN. Conversely, the SNR may degrade at a faster rate (e.g. slope of curve 1010, about 3.5 dB SNR loss for ten probing downstream network units) for a high SNR channel (e.g. AWGN of 35 dB) as channel noise may be dominated by inaccuracies of upstream channel estimates when multiple downstream network units are probed in a single probing symbol.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Unless otherwise stated, the term "about" means±10% of the subsequent number. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A central access network unit comprising:
a processor configured to:
assign a plurality of upstream training blocks from an upstream orthogonal frequency division multiplexing (OFDM) symbol to a plurality of downstream network units, wherein the OFDM symbol comprises a plurality of pilot subcarriers equally spaced across an upstream radio frequency (RF) spectrum in a pre-determined time interval, and wherein each upstream training block comprises a different subset of the pilot subcarriers that are non-consecutive and situated across the upstream RF spectrum; and
generate one or more messages comprising assignments of the upstream training blocks; and
a transmitter coupled to the processor and configured to transmit the messages to the plurality of downstream network units via a network, wherein the messages instruct at least one of the plurality of downstream network units to transmit a modulated pre-determined sequence at the pilot subcarriers corresponding to the upstream training block assigned to the at least one downstream network unit,
wherein the message comprises:
a Symbol In Frame parameter that specifies a probing symbol within a probing frame, wherein the Symbol In Frame parameter is a number of symbols offset from a beginning of the probing frame;
a starting subcarrier parameter that indicates a starting subcarrier to be used by a probing pattern;
a stagger (St) parameter that indicates whether a staggered pattern is to be employed for the pilot subcarriers; and
a subcarrier parameter that is number of subcarriers to be skipped between successive pilots in the probing pattern,
wherein when the staggered pattern is to be employed, the subcarrier skipping parameter is associated with the number of symbols for which the probing pattern applies.

2. The central access network unit of claim 1, wherein each upstream training block comprises a different starting pilot subcarrier position and a same number of excluded subcarriers.

3. The central access network unit of claim 1, wherein the network is an Ethernet passive optical network over coax (EPoC) network, wherein the central access network unit is a Coaxial Line Terminal (CLT), and wherein the downstream network units are Coaxial Network Units (CNUs).

4. The central access network unit of claim 1, wherein the network is a data over cable service interface specification (DOCSIS) network, wherein the central access network unit is a Cable Modem Termination System (CMTS), and wherein the downstream network units are Cable Modems (CMs).

5. A method implemented by a Cable Modem Termination System (CMTS) comprising:
allocating, by the CMTS, a probing symbol comprising N subcarriers equally spaced within a probing frame for wideband probing such that the subcarriers are spread across a 2048-point (2K) Fast Fourier Transform (FFT) band or a 4096-points (4K) FFT band;

defining a probing pattern in the probing symbol, wherein the probing pattern comprises a set of pilots from scattered subcarriers of the probing symbol; and instructing a Cable Modem (CM) to transmit a probing sequence in the probing symbol, wherein instructing the CM to transmit the probing sequence comprises sending an upstream bandwidth allocation map (MAP) message comprising:

a Symbol In Frame parameter that specifies the probing symbol within the probing frame, wherein the Symbol In Frame parameter is a number of symbols offset from a beginning of the probing frame;

a starting subcarrier parameter that indicates a starting subcarrier to be used by the probing pattern;

a stagger (St) parameter that indicates whether a staggered pattern is to be employed for pilot subcarriers; and a subcarrier skipping parameter that is a number of subcarriers to be skipped between successive pilots in the probing pattern, wherein when the staggered pattern is to be employed, the subcarrier skipping parameter is associated with the number of symbols for which the probing pattern applies.

6. The method of claim 5 further comprising instructing the CM to transmit zero valued subcarriers in exclusion subcarriers.

7. The method of claim 6, wherein the starting subcarrier parameter ranges from zero to seven, and wherein the subcarrier skipping parameter ranges from zero to seven.

8. The method of claim 5 further comprising:
performing pre-equalization configuration; and
performing periodic transmission power and time-shift ranging.

9. The method of claim 5, wherein the probing frame comprises K contiguous probing symbols that are Orthogonal Frequency Division Multiplexing (OFDM) symbols, wherein K is a number of symbols in a minislot, and wherein the probing frame is aligned with boundaries of the minislot in a time domain.

10. A network unit in a coaxial network comprising:
a receiver configured to receive a message indicating an assigned upstream training block in an upstream orthogonal frequency division multiplexing (OFDM) symbol comprising N pilot subcarriers equally spaced across a 2048-point (2K) Fast Fourier Transform (FIT) upstream frequency spectrum or a 4096-points (4K) FFT upstream frequency spectrum of the network unit in a pre-determined time interval, wherein the upstream training block comprises a subset of the pilot subcarriers that are non-consecutive and situated across the upstream frequency spectrum,
wherein the message comprises:

a Symbol In Frame parameter that specifies a probing symbol within a probing frame, wherein the Symbol In Frame parameter is a number of symbols offset from a beginning of the probing frame;

a starting subcarrier parameter that indicates a starting subcarrier to be used by a probing pattern;

a stagger (St) parameter that indicates whether a staggered pattern is to be employed for the pilot subcarriers; and a subcarrier skipping parameter that is a number of subcarriers to be skipped between successive pilots in the probing pattern, wherein when a staggered pattern is to be employed, the subcarrier skipping parameter is associated with the number of symbols for which the probing pattern applies;

a processor coupled to the receiver and configured to generate the upstream training block by modulating a pre-determined sequence onto the pilot subcarriers of the upstream training block based on the parameters indicated by the message; and a transmitter coupled to the processor and configured to send the upstream training block via the coaxial network.

11. A method implemented by a Cable Modem Termination System (CMTS) comprising:
generating an upstream bandwidth allocation map (MAP) message comprising:

a Symbol In Frame parameter that specifies a probing symbol within a probing frame, wherein the Symbol In Frame parameter is a number of symbols offset from a beginning of the probing frame;

a starting subcarrier parameter that indicates a starting subcarrier to be used by a probing pattern;

a stagger (St) parameter that indicates whether a staggered pattern is to be employed for pilot subcarriers; and a subcarrier skipping parameter that is a number of subcarriers to be skipped between successive pilots in the probing pattern, wherein when a staggered pattern is to be employed, the subcarrier skipping parameter is associated with the number of symbols for which the probing pattern applies; and sending the MAP message via a coaxial network.

12. The method of claim 11, wherein the St parameter has one bit having a first value that indicates the staggered pattern is to be employed for the pilot subcarriers or a second value that indicates no staggering is to be used.

13. The central access network unit of claim 1, wherein the St parameter has one bit having a first value that indicates the staggered pattern is to be employed for the pilot subcarriers or a second value that indicates no staggering is to be used.

14. The method of claim 5, wherein the St parameter has one bit having a first value that indicates the staggered pattern is to be employed for the pilot subcarriers or a second value that indicates no staggering is to be used.

* * * * *